United States Patent [19]

Hendrikx et al.

[11] E Patent Number: Re. 33,733

[45] Reissued Date of Patent: Nov. 5, 1991

[54] DEVICE FOR DRIVING A DRILLING AND/OR IMPACTING TOOL

[76] Inventors: Wilhelmus J. M. Hendrikx, 297 Liesboslaan, 4838 Ev Breda; Antonie J. Moolenaar, 27 Cypressenstraat, 4949 An Dorst; Jan P. Houben, 56 Rechterenstraat, 4834 Lv Breda, all of Netherlands

[21] Appl. No.: 289,365

[22] Filed: Dec. 22, 1988

Related U.S. Patent Documents

Reissue of:

[64] Patent No.: 4,726,430
Issued: Feb. 23, 1988
Appl. No.: 673,617
Filed: Nov. 21, 1984

[30] Foreign Application Priority Data

Nov. 24, 1983 [NL] Netherlands ..... 8304043

[51] Int. Cl.[5] ..... B23B 45/16

[52] U.S. Cl. ..... 173/109; 173/119; 173/122

[58] Field of Search ..... 173/13, 48, 109, 117, 173/118, 119, 120, 121, 122

[56] References Cited

U.S. PATENT DOCUMENTS

| | | | |
|---|---|---|---|
| 1,494,525 | 5/1924 | Alexander . | |
| 1,708,658 | 4/1929 | Brown | 173/120 |
| 3,645,021 | 2/1972 | Sonerud | 173/119 X |

FOREIGN PATENT DOCUMENTS

| | | | |
|---|---|---|---|
| 296710 | 11/1915 | Fed. Rep. of Germany . | |
| 499505 | 3/1930 | Fed. Rep. of Germany . | |
| 910160 | 3/1954 | Fed. Rep. of Germany | 173/120 |
| 2048753 | 12/1980 | United Kingdom . | |
| 2058645 | 3/1981 | United Kingdom . | |

*Primary Examiner*—Frank T. Yost
*Assistant Examiner*—Willmon Fridie, Jr.
*Attorney, Agent, or Firm*—Jones, Day, Reavis & Pogue

[57] ABSTRACT

A device for driving a drilling and/or impacting tool including a shaft journalled in a housing so as to be rotatable, if necessary. One end of the shaft is connectable with the tool whereas the other end is accessible for an oscillatory impact body movable in the housing by a guide, a rotatable driving shaft setting and a transmission. The transmission includes a device for converting the rotary movement of the driving shaft into an oscillatory movement of a driving element which is connected through an elastic member with the impact body.

18 Claims, 6 Drawing Sheets

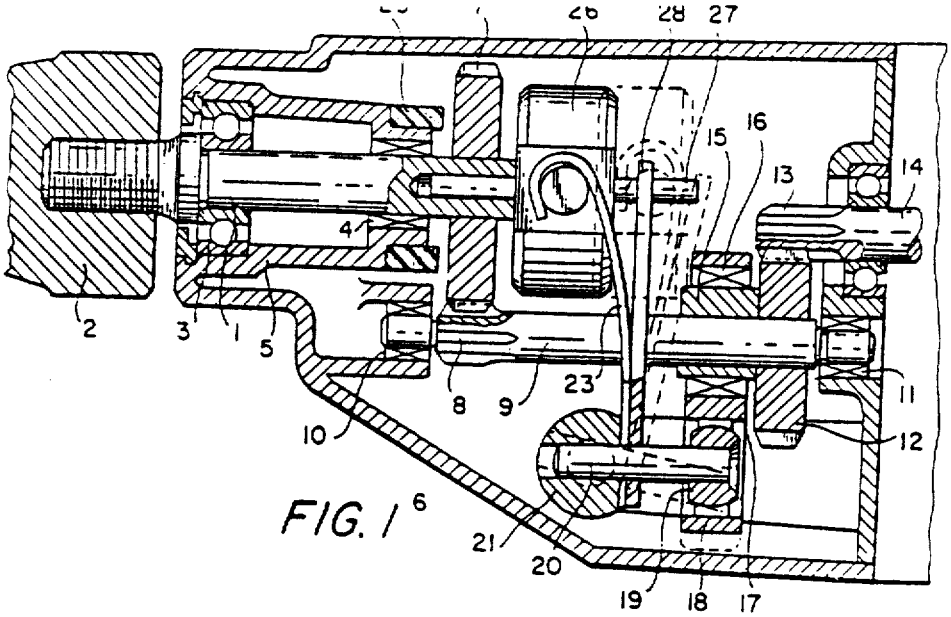
FIG. 1
FIG. 2
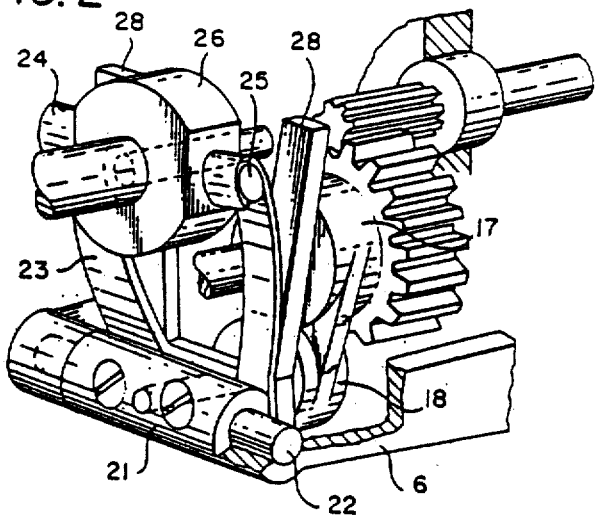

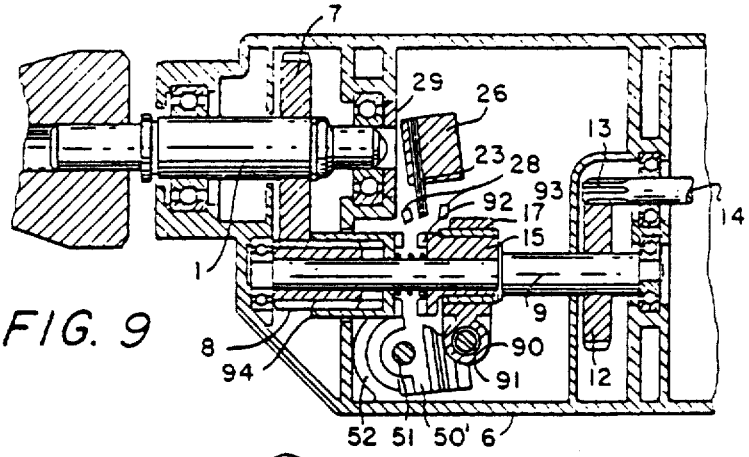
FIG. 9
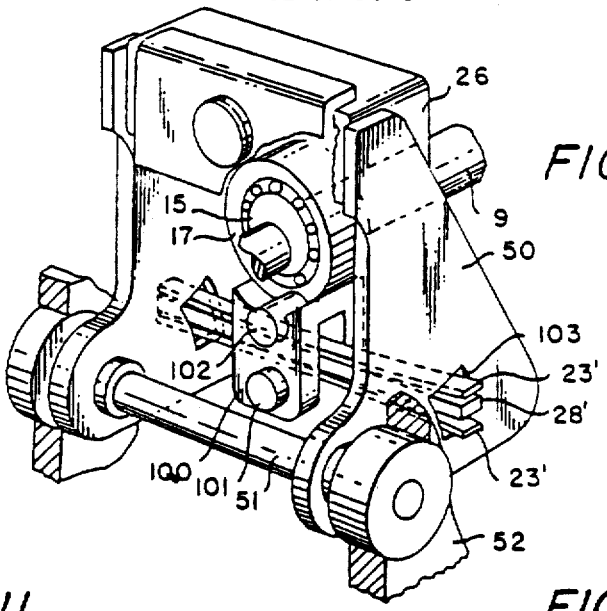
FIG. 10
FIG. 11
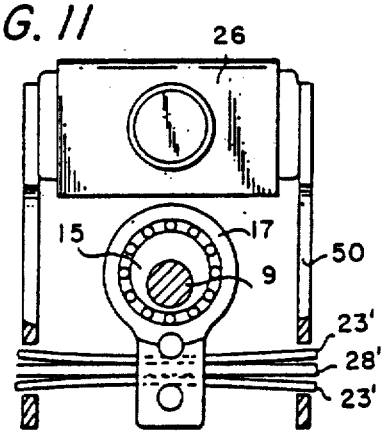
FIG. 12
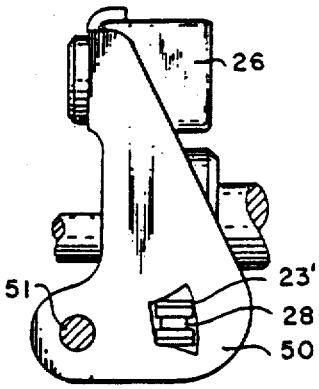

DEVICE FOR DRIVING A DRILLING AND/OR IMPACTING TOOL

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a device for driving a drilling and/or impacting tool comprising a shaft, which is arranged, if necessary, in a rotatable manner in a housing, and one end of which is adapted to be fastened to the tool, whereas the other end is accessible to an oscillating impact body which is movable by means of a guide in the housing, whilst a rotatable driving shaft through a transmission can be set for moving the tool shaft and/or the impact body.

2. Description of Background Art

A device of the kind set forth in the preamble, also known by the term of rotohammer, impact drilling machine or hammer drilling machine is in general provided with an impact body arranged in a cylindrical guide. The impact body is freely reciprocatable as a piston in the cylinder, and the drive is performed by a main piston arranged at the bottom of the cylinder and being driven by a motor in an oscillatory manner. As a result of the pressure differences between the two pistons a free impact effect is produced on the one hand on the tool shaft, whereas on the other hand impact contact between the main piston and impact body is avoided by the air cushion, which may be regarded as being a progressively operating air spring. Therefore, this spring represents the reversal of the direction of movement.

Such devices are, however, fairly complicated in construction and due to the freedom of movement of the impact body the required impact frequency cannot be attained at all numbers of revolution. Moreover, due to the adiabatic compression in the cylinder cinetic energy loss occurs apart from friction loss due to the required seals, which becomes manifest in heat and wear.

SUMMARY AND OBJECTS OF THE INVENTION

The invention has for its object to obviate the aforesaid disadvantages and provides to this end a device which is distinguished in that the transmission is provided with means for converting the rotary movement of the driving shaft into an oscillatory movement of a driving element, which is connected through an elastic member with the impact body. The elastic member preferably has a non-linear spring characteristic curve.

Thanks to the steps described above the impact body will lag with respect to the elastic element because of the interposed elastic member, whilst in addition the kinetic energy can be flexibly picked up and transferred to the optimum to the tool shaft.

In one embodiment the elastic member is a metal spring, preferably a leaf spring, which simplifies the construction.

In order to render the leaf spring progressively operative, so that an ideal reversal of the kinetic energy of the impact body is obtained, the driving element comprises a supporting arm extending along on both sides of the leaf spring, which element with the leaf spring is pivotally journalled in the housing. Owing to the oscillatory pivotal movement of the element the leaf spring extending along the supporting arm will develop along the supporting arm so that the desired progressive effect is obtained. The supporting arm serves, moreover, as a load inhibitor for the leaf spring.

In a further embodiment of the device in accordance with the invention the other end of the tool shaft is provided with a sliding guide for the impact body directed towards said end in order to ensure the correct impact effect. In a further embodiment the guide is constructed in the form of a pivotal mechanism.

BRIEF DESCIRIPTION OF THE DRAWINGS

The invention will be described more fully with reference to a number of embodiments.

The drawing shows in:

FIG. 1 an axial sectional view of part of a transmission part of a device embodying the invention, FIG. 2 a perspective view of part of the transmission device, FIGS. 3 and 4 an axial sectional view like FIG. 1 and a perspective view like FIG. 2 respectively of a second embodiment, FIG. 5 an axial sectional view like FIG. 1 of a third embodiment, FIGS. 6 and 7 each an axial sectional view like FIG. 1 of two alternative embodiments of the elastic member and FIG. 8 an axial sectional view like FIG. 5 of a fourth embodiment, FIG. 9 an axial sectional view like FIG. 3 of a fifth embodiment, provided with a coupling means, FIGS. 10, 11 and 12 a perspective view, front view and side elevational view respectively of a part of the transmission device of a sixth embodiment, FIG. 13 a perspective view like FIG. 10 of a part of the transmission device in a seventh embodiment, FIG. 14 a elevational sectional view according to line XIV—XIV in FIG. 13, FIG. 15 a cross-sectional view according to XV—XV in FIG. 14.

DETAILED DESCRIPTION OF THE PREFERRED EMBODIMENTS

Figure 3:
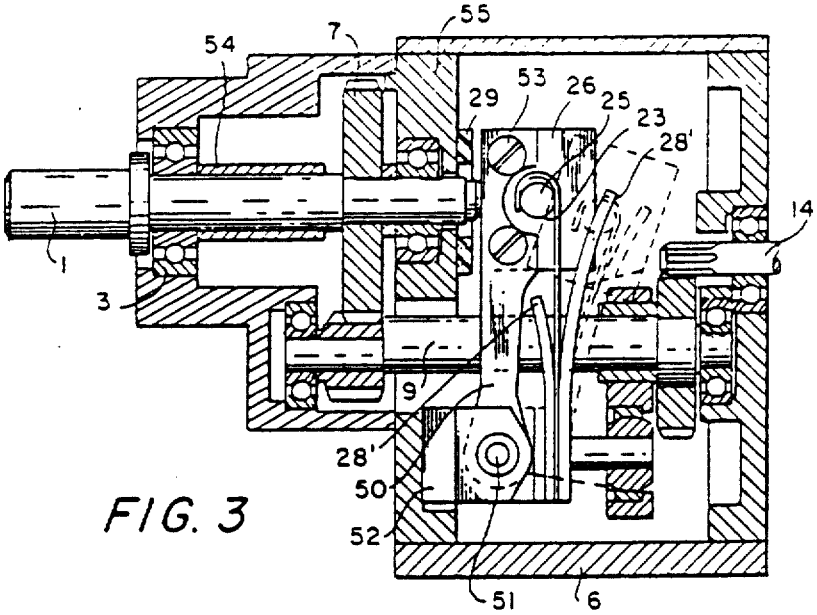

The embodiment shown in FIGS. 1 and 2 of the foremost part of a drilling and/or impacting device mainly comprises a tool shaft 1 provided at the left-hand end as viewed in FIG. 1 with means for receiving the tool holder 2 in which a tool can be arranged in known manner.

The tool shaft 1 is rotatable by means of bearings 3, 4 in the hub-shaped part 5 of a housing 6 and freely displaceable over a given axial distance. The other, opposite end of the tool shaft 1 is provided with a fixedly secured gear wheel 7, which co-operates with a pinion 8 of an intermediate shaft 9. The intermediate shaft 9 is journalled in the housing 6 by means of the bearings 10 and 11. The intermediate shaft 9 is furthermore provided with a gear wheel 12 co-operating with a pinion 13 on a shaft 14, which is driven by a motor or the like (not shown).

The intermediate shaft 9 is provided at the side of the gear wheel 12 with an eccentric sleeve 15, which is surrounded through a bearing 16 by a ring 17. The ring 17 is coupled with a second ring 18 holding a universal bearing 19. The universal bearing 19 is connected with a pin 20 which is rigidly secured at the end remote from the bearing to an element 21 directed transversely to the intermediate shaft 9 and provided at both ends with bearing stubs 22 rotatably journalled in the housing 6.

The element 21 is connected with a mainly U-shaped leaf spring 23, the limbs of which go over to curved end pieces 24, which surround bearing stubs 25 of an impact body 26.

The impact body 26 has a given mass depending on the type of machine and has a central hole through which passes a pin 27 registering with the tool shaft 1.

The element 21 has furthermore arms 28 rigidly secured thereto and extending upwards from the element 21 along the limbs of the leaf spring 23.

The device described above operates as follows.

The inwardly projecting hub 5 is equipped at the end facing the impact body with a buffer 29, which limits the free displacement to the left of the tool shaft 1 and which damps the percussion energy in the no-load state.

By rotating the driving shaft 14 the intermediate shaft 9 and the tool shaft 1 are set rotating through the transmission formed by the gear wheels 7, 8 and 12, 13.

Owing to the rotation of the intermediate shaft 9, the ring 17 and the ring 18 respectively will move up and down owing to the eccentric sleeve 15. The upward and downward movement of the ring 18 is transformed into a swinging movement of the driving element 21 about the bearing journals 22 thereof. This swinging movement is transferred to the leaf springs 23 as well as to the arms 28. Therefore, the leaf springs 23 will slide the mass 26 to and fro along the pin 27, whilst at each backward movement and the subsequent forward movement the leaf spring 23 more or less intimately engages the arm 28.

With a more intimate engagement the rigidity of the leaf spring 23 increases so that a progressive spring effect is obtained. The progressive spring effect contributes to a uniform reversal of the direction of movement of the impact body 26 so that the kinetic energy is transferred to the inwardly projecting end of the tool shaft 1 practically without development of heat and with maximum efficiency.

Figure 4:
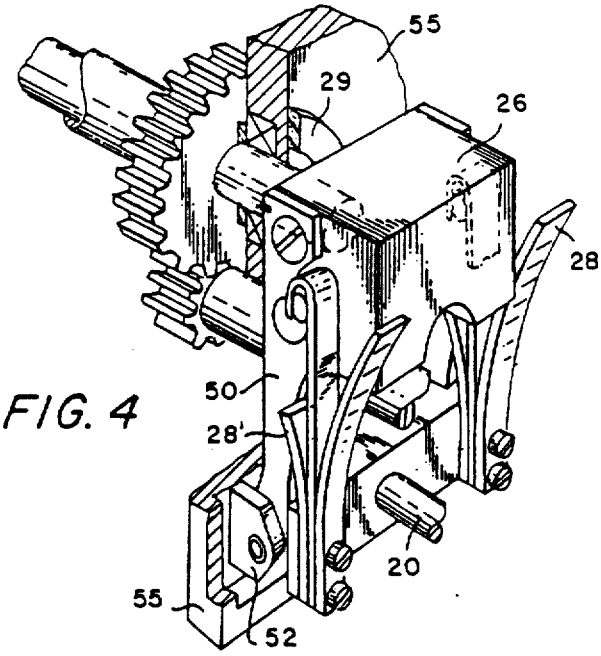

FIGS. 3 and 4 show an embodiment in which the transmission members and the complete disposition of the shafts correspond to the embodiment of FIG. 1. Therefore, the same reference numerals are used.

The difference of this embodiment resides in the lack of the axial pivot guide 27, which is replaced by two pivot arms 50, which are pivotally journalled about a shaft 51 below in the housing. The shaft 51 is held in supports 52 rigidly secured to the housing. The free end of each arm 50 is fastened by screws 53 to the impact body 26. About the same shaft 51 is furthermore pivotable the elastic member formed by a leaf spring 23, a curved top end of which grips around lugs 25 of the impact body 26 in the manner described above. The tilting movement of the leaf spring 23 results through the same transmission from the driving shaft 14 as described with reference to FIG. 1.

It should be noted that in the neutral position the leaf spring 23 does not have a curved shape and is provided on both sides with supporting arms 28, 28', which diverge in upward direction. Also these supporting arms provide by their predetermined curvature a progressive spring effect, whilst the impact body 26 describes an arcuate path, the centre of rotation of which is the shaft 51. Thanks to the independent swinging motion of the leaf spring [25] *23* with respect to the arm 50 the impact body 26 will lag with respect to the motion of the leaf spring [25] *23*. With a correct proportioning the full percussion energy concentrates on one end of the tool shaft 1.

The tool shaft 1 is provided with a gear wheel 7 rigidly secured thereto and the free axial movement of the shaft 1 is limited by a sleeve 54 arranged between the outermost bearing 3 and the gear wheel 7.

The buffer 29 for absorbing the percussion energy in the idle state of the tool shaft 1 is fastened in this case to an intermediate wall 55 of the housing 6.

Figure 5:
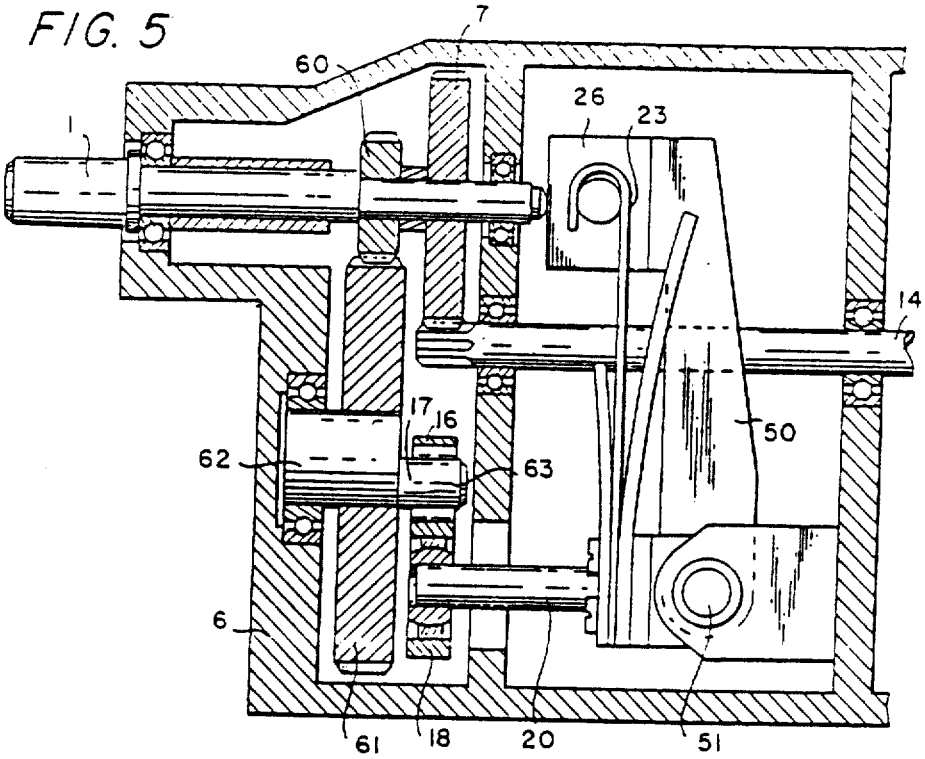

FIG. 5 shows an embodiment in which the impact mechanism corresponds with respect to its component parts to the embodiment of FIG. 3, the difference being that the rocking pin 20 is directed to the front away from the means 17, 18.

In this embodiment the tool shaft 1 is provided at the side of the driving gear wheel 7, which is now directly driven by the motor shaft 14, with a pinion 60, which co-operates with a gear wheel 61 secured to an intermediate shaft 62 journalled in the housing 6. The intermediate shaft 62 is equipped with an axially extending eccentric pin 63, which extends in a bearing 16 of the transmission means imparting to the pin 20 a tilting movement about the shaft 51. In this embodiment the leaf spring 23 is arranged on the tool side of the fixed pivotal arms 50, but the mode of operation corresponds with that of FIG. 3. In this embodiment a particular impact effect can be obtained in which the percussion tool, for example, a drill occupies each time one or more angular positions at the instant when the impact body 26 strikes the tool shaft 1. When the transmission ratio of the gear wheels is 1:1, the tool will each time occupy a single angular position.

Figure 6:
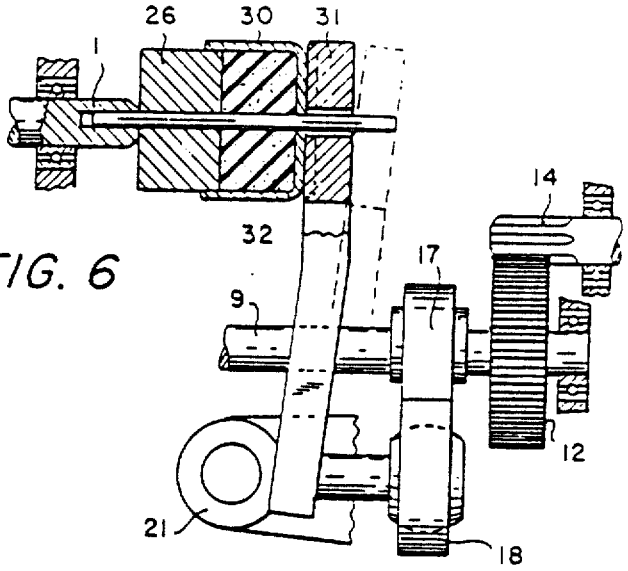
Figure 7:
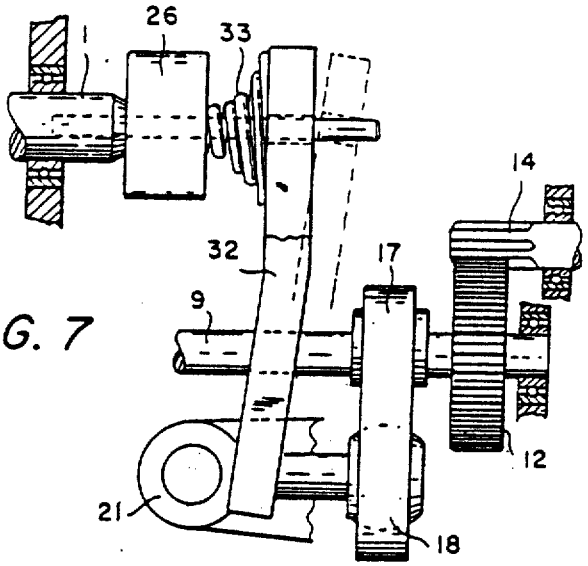

FIGS. 6 and 7 each show an alternative embodiment of spring elements. In the figure the same reference numerals are used for the corresponding elements of FIGS. 1 and 2.

The leaf spring 23 is replaced here by a body 30 of elastic material which is vulcanized on the one hand to the impact body 26 and on the other hand to the plate 31. The plate 31 is connected with an arm 32 corresponding with the arm 28 and guiding to the driving body 21.

The elastic body 30 is made from a material such that the progressive effect is ensured. The body may be porous or may have more or less cavities in order to obtain said progressive effect.

FIG. 7 shows an embodiment in which the spring element is formed by a helical spring, the turns of which exhibit decreasing radii of curvature. The thickness of the material or the variation in radius of curvature is such that again a progressive spring effect is ensured.

The two embodiments of FIGS. 6 and 7 operate like the embodiments described with reference to FIGS. 1 and 2.

Figure 8:
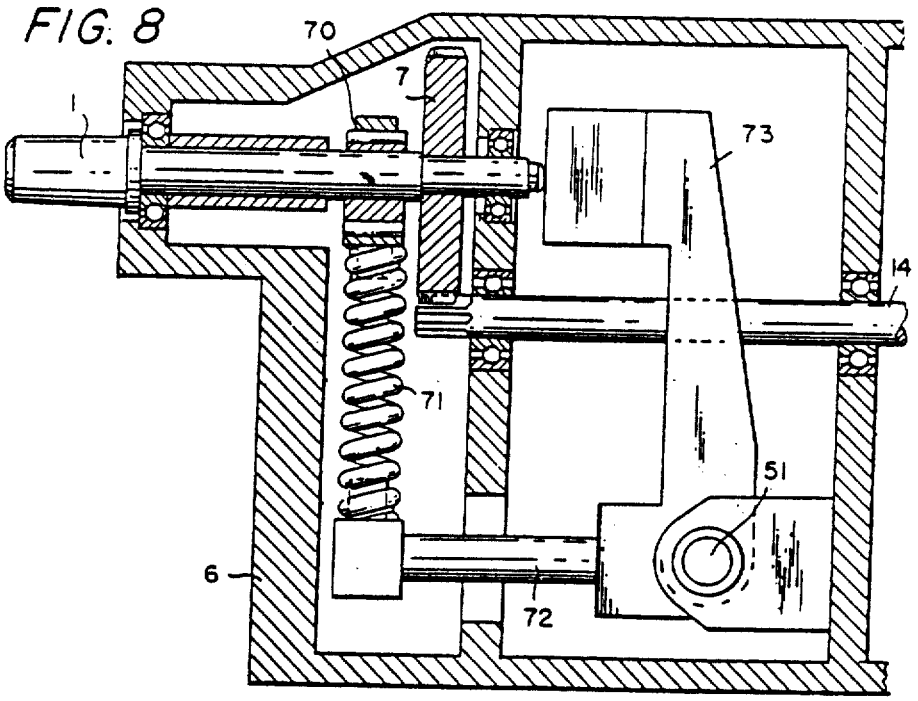

FIG. 8 shows an embodiment in which the means for converting the rotary movement into a reciprocatory movement are formed by an eccentric 70 comparable to the ring 17 of the preceding figures, the outer ring forming in this case, in addition, the driving element. With this ring element is coupled one end of an elastic member formed by a spring 71, the other end of which is connected with a stem 72 of an impact body 73. The stem 72 and the impact body 73 rigidity secured to the former are pivotable about the shaft 51 and journalled in the housing 6.

The embodiment according to FIG. 9 is substantially similar with the embodiment of FIG. 3 and the same reference numerals are used for the same parts. In this embodiment the ring 17 is provided with a bearing hub 90 engaging a pivot pin 91 rigidly secured in the pivot body 50'. This pivot body 50' is comparable with the pivot arms 50 in FIG. 3. The body 50' is pivotally journalled about a shaft 51 in the lower portion of the housing 6. The shaft 51 is held in supports 52 rigidly secured to the housing.

Furthermore the eccentric sleeve 15 is at the side face provided with a part of a claw-coupling 92, which cooperates with a second part 93, which is slidably to and fro of the coupling.

The movable coupling part 93 is provided with a sleeve-like extension 94, fitting over the pinion 8 of the intermediate shaft 9. The end face of the sleeve 94 abuts the side face of the gear wheel 7 of the tool shaft 1.

The mechanism of FIG. 9 operates as follows:

When pushing the tool against a work piece the shaft 1 will be urged inwardly in the housing 6, so shifting the gear wheel 7 to the right in FIG. 9. When shifting the gear wheel 7 the sleeve 94 will also be shifted to the right, whereupon the coupling part 93 will contact the coupling part 92 so establishing a connection between the intermediate shaft 9 through pinion 8, sleeve 94 to eccentric sleeve 15. So rotating the shaft 9 the eccentric sleeve 15 will cause an upwards and downwards movement of the hub 90 and shaft 91, whereupon the swing body 50' will swing around pivot axis 51. Since the spring blades 23 are rigidly secured to the pivot body 50', and the mass 26 is also rigidly secured to the leaf springs 23, a swinging movement of the body 50' will cause a swinging movement f the mass 26, which will hit the end face of tool shaft 1, since this face protrudes in a rearward position beyond the buffer 29 of the housing 6. As soon as the work piece is left the helical spring in between the coupling parts 92, 93 will urge the sleeve 94 to the left in FIG. 9, so stopping the percussion action of the mass 26 upon the end face of shaft 1, since the connection of eccentric sleeve 15 to the intermediate shaft 9 is broken.

In the FIGS. 10, 11 and 12, showing a sixth embodiment of the invention the same reference numerals are used for the same elements described hereabove.

The impact mass 26 is rigidly secured to pivot arms 50, which are pivotally journalled about a shaft 51 below in the housing, whereas the shaft 51 is held in supports 52 of the housing. The structure is substantially similar to the structure in FIGS. 3 and 4.

The intermediate shaft 9 is also provided with an eccentric sleeve 15 bearing a ring 17, corresponding to a structure as shown in FIG. 9.

However the ring 17 is provided with a U-shaped bracket 100 at its lower side.

The U-shaped bracket 100 is further provided with two stubs 101, 102 arranged vertically above each other. A certain distance is left between the stubs 101, 102. The elastic member is formed by a pair of leaf springs, extending parallel to the axis 51 and through the nip of the stubs 101, 102 up to an orifice 103 in each pivot arm 50. In between the leaf springs 23' a strip 28' is arranged, which strip is comparable with the arms 28 in FIG. 1, 3 and 9. In a neutral position the leaf springs 23' are in contact with the strip 28' in the middle area near the stubs 101, 102, whereas the leaf springs are curved upwardly and downwardly respectively near their outer ends. Said outer ends are in contact with the edges of the orifice 103.

The transmission as shown in FIG. 10–12 operates as follows. When rotating the intermediate axis 9, the eccentric sleeve 15 will urge the ring 17 in a down- and upwards movement so taking along the bracket 100 and stubs 101, 102 as well. So the middle area of the spring leaf set 23', 28' are moved up- and downwardly which movement will cause a swinging movement of the arms 50 and impact mass 26 as well. During the upwards movement of the bracket 100, the top leaf spring 23' will become more and more in intimately contact with the strip 28'. When moving downwards the lower leaf spring 23' will contact the strip 28' more and more, so increasing the rigidity of the leaf spring 23' so that a progressive spring effect is obtained.

It is to be noticed that the hammering action of the impact mass 26, can be optimized by altering the distance between the leaf spring set 23' and the pivot axis 51. Thereto special arrangements can be made to displace the pivot axis 51 with respect to the swing arms 50 and/or to enlarge the orifice 103 to be able to shift the spring set more or the less in the direction of pivot axis 51. Those arrangements are not shown but it should be clear for every person skilled in the art.

It is obvious that the transmission shown in FIGS. 10–12 can be provided with an coupling means as taken up in the transmission of FIG. 9.

Figure 13:
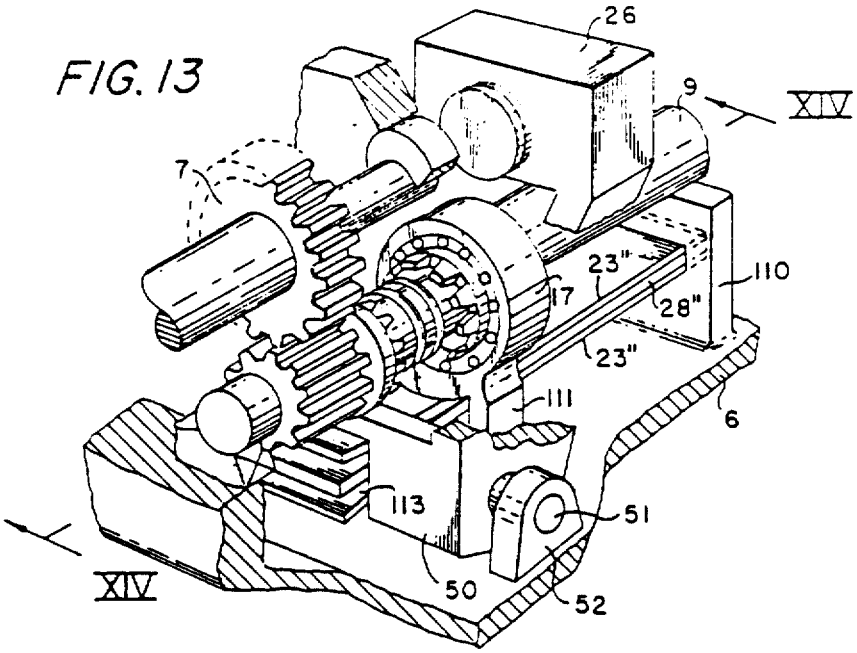
Figure 14:
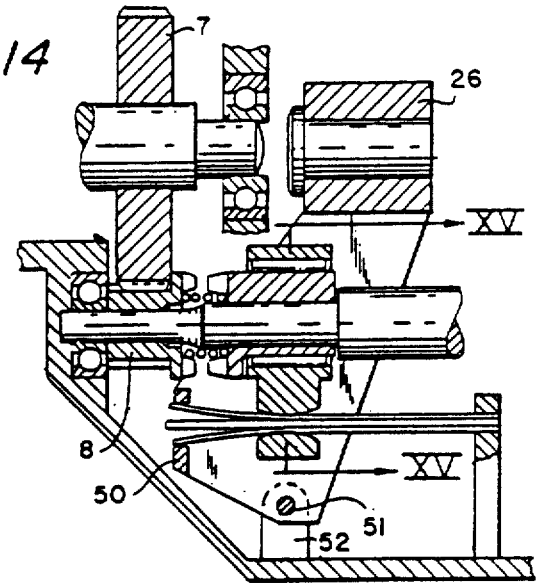
Figure 15:
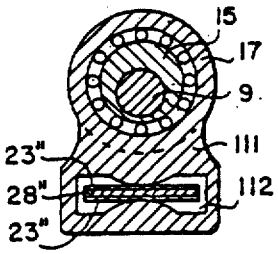

Turning now to FIGS. 13, 14 and 15 it appears that a similar set of leaf springs 23' and intermediate strip 28" are used in the transmission shown. It is noted that in these figures the same reference numerals are used for the same elements. The spring set is however arranged parallel to the intermediate axis 9, so perpendicular to the spring set in FIG. 10. Such an arrangement has the advantage that the total space necessary to mount the different elements of this structure is diminished. The leaf spring set is fixedly secured in a support 110 of the housing 6. The ring 17 around the intermediate shaft 9 is provided with a bracket 111, having a through-hole 112, see FIG. 15. The spring set 23", 28" is let through said hole 112 and through a orifice 113 of the pivot body 50. The orifice 113 has a width able to take up the outwardly curved outer ends of the leaf springs 23" and the strip 28" as well.

*As shown in FIGS. 13–15, the elastic member comprises a support strip 28" mounted between the leaf springs 23". Corresponding ends of the support strip and the leaf springs are fixed to the housing by the bracket 110. The distal ends of the leaf springs 23" progressively diverge from the support strip when they are in the relaxed state as shown in FIG. 14. Thus, the progressive or non-linear spring effect is achieved. As will be observed from FIGS. 13 and 14, the motion converting means", engaged the leaf springs adjacent their distal ends.*

The operation of this transmission is similar to the operation of the transmission according to FIGS. 10, 12, since a rotation of the intermediate shaft 9 will give an up and downwards movement to the bracket 111 and the middle area of the spring set 23". The up and down moving end portions of the leafs 23" will cause an swing movement of the pivot body 50 around pivot shaft 51, and so a swinging movement of the impact mass 26. The transmission is provided with a claw-coupling mechanism as described in FIG. 9.

The invention is not limited to the embodiments described above. For example, the transmission between the various shafts may comprise more than one pair of gear wheels.

What is claimed is:

1. A device for driving a drilling and/or impacting tool comprising:

a tool shaft journalled in a housing so as to be rotatable, if necessary, one end of said shaft being connectable with the tool whereas the other end is accessible for engagement with an oscillatory impact body movable in the housing by means of a guide and a rotatable driving shaft operatively connected through a transmission for impacting rotation to the tool shaft and/or movement to the impact body against the tool shaft, characterized in that the transmission comprises means for converting the rotary movement of the driving shaft into an oscillatory movement of a driving element, which is connected through an elastic member with the impact body, said elastic member has a non-linear spring characteristic.

2. A device as claimed in claim 1, characterized in that the elastic member is a metal spring.

3. A device as claimed in claim 1, characterized in that the elastic member is formed by at least one leaf spring.

4. A device as claimed in claim 3, characterized in that the driving element comprises a supporting arm extending along the curved leaf spring, said driving element being pivotally journalled in the housing.

5. A device as claimed in claim 4, characterized in that a supporting arm is provided on each side of the leaf spring.

6. A device as claimed in claim 4 characterized in that the or each arm is made from elastic material having a spring characteristic curve differing from that of the leaf spring.

7. A device as claimed in claim 1 characterized in that at the end remote from the tool shaft is provided with a sliding guide for the impact body extending away from said end.

8. A device as claimed in claim 1, and further including pivotol arms, said guide for the impact body [is] *being* formed by one or more of said pivotol arms.

9. A device as claimed in claim [1,] *8* characterized in that said elastic member is arranged between said [motion converting means] *means for converting the rotary movement* and said pivotol arm of the impact [*mass*] *body*.

10. A device according to claim 9, characterized in that said elastic member is formed as a pair of leaf springs, the outer ends of which are diverging from each other, said diverging outer ends being taken up in an orifice of said pivotable arm.

11. A device as claimed in claim 10, characterized in that a support strip is arranged in between said pair of leaf springs.

12. A device as claimed in claim 1, characterized in that said transmission is provided with coupling means to connect the motion converting means to said driving shaft.

13. A device as claimed in claim 12, characterized in that said coupling means is a claw-coupling, one part of which is axially slidable upon an intermediate shaft of said transmission, said sliding movement being derived from said impact body imparting a shafting motion to said tool shaft.

14. A device for driving a drilling and/or impacting tool comprising:

a housing, a shaft journalled in said housing for rotation and for reciprocation, said shaft having a first end projecting from said housing and a second end being disposed within said housing;

an oscillatory impact body being operatively disposed within said housing adjacent to said second end of said shaft;

a guide for guiding the movement of said oscillatory impact body;

a rotatable driving means for imparting rotation to said shaft;

transmission means for converting rotation of the rotatable driving means into an oscillatory movement; and, an elastic member having a non-linear spring characteristic connected to said housing for restraining said impact body during oscillation, said elastic member includes a leaf spring selectively engageable with an arm for controlling the spring character of said leaf spring.

*15. The device according to claim 9 characterized in that said elastic member comprises a support strip and at least one leaf spring.*

*16. The device according to claim 15 characterized in that the leaf spring has a fixed end and a distal end which progressively diverges from said support strip when said leaf spring is in its relaxed state.*

*17. The device according to claim 9 characterized in that said elastic member comprises a support strip arranged between a pair of leaf springs, means for fixedly securing corresponding ends of said strip and said leaf springs to said housing, the distal ends of said leaf springs progressively diverging from said support strip when said leaf springs are in their relaxed state.*

*18. The device according to claim 17 characterized in that said motion converting means engages said leaf springs adjacent the distal ends of the latter.*

* * * * *